US010614488B2

(12) United States Patent
Avalos et al.

(10) Patent No.: US 10,614,488 B2
(45) Date of Patent: Apr. 7, 2020

(54) DIGITAL SIGN ADVERTISEMENT SELECTION BASED ON MOBILE DEVICE ACTIVITY

(71) Applicant: INTEL CORPORATION, Santa Clara, CA (US)

(72) Inventors: Jose A Avalos, Chandler, AZ (US); Addicam V Sanjay, Gilbert, AZ (US); Shweta Phadnis, Chandler, AZ (US); Lakshman Krishnamurthy, Portland, OR (US); Miriam Selvaraj, Santa Clara, CA (US)

(73) Assignee: INTEL CORPORATION, Santa Clara ( * ) Notice: Subject to any disclaimer, the term of this patent is extended or adjusted under 35 U.S.C. 154(b) by 0 days.

(21) Appl. No.: 15/136,796

(22) Filed: Apr. 22, 2016

(65) Prior Publication Data

US 2016/0239874 A1 Aug. 18, 2016

Related U.S. Application Data

(63) Continuation of application No. 13/629,695, filed on Sep. 28, 2012, now abandoned.

(51) Int. Cl.
*G06Q 30/00* (2012.01)
*G06Q 30/02* (2012.01)
(Continued)

(52) U.S. Cl.
CPC ..... *G06Q 30/0267* (2013.01); *G06Q 30/0255* (2013.01); *G06Q 30/0256* (2013.01);
(Continued)

(58) Field of Classification Search
CPC .......... G06Q 30/0267; G06Q 30/0269; G06Q 30/0256; G06Q 30/0261; G06Q 30/0255; H04W 4/02; H04L 67/22
See application file for complete search history.

(56) References Cited

U.S. PATENT DOCUMENTS

2008/0089288 A1\* 4/2008 Anschutz ............... G06Q 30/02
370/331
2008/0133336 A1\* 6/2008 Altman .............. G06Q 30/0207
455/456.1
(Continued)

OTHER PUBLICATIONS

"Using pervasive computing technologies to deliver personal and public ads in public spaces". Santos. IEEE, Jun. 20-23, 2012 (Year: 2012).\*

*Primary Examiner* — Maria V Vanderhorst

(57) ABSTRACT

Various embodiments are directed to cooperation among computing devices to employ visually identifiable traits of a person and data concerning their online activities to determine subjects of interest to them and select advertisements. An apparatus comprises a processor circuit; an interface operative to communicatively couple the processor circuit to a network; and a storage communicatively coupled to the processor circuit and arranged to store a sequence of instructions operative on the processor circuit to: monitor online activities comprising interactions with a computing device via the interface and the network; store collected data about the online activities; store profile data comprising visually identifiable traits; detect a signage device; and form a link with the signage device via the interface and transmit the profile data to the signage device via the link in response to detection of the signage device. Other embodiments are described and claimed herein.

25 Claims, 9 Drawing Sheets

(51) Int. Cl.
*H04W 4/029* (2018.01)
*H04L 29/08* (2006.01)
*G05B 19/418* (2006.01)

(52) U.S. Cl.
CPC ..... *G06Q 30/0261* (2013.01); *G06Q 30/0269* (2013.01); *H04L 67/22* (2013.01); *H04W 4/029* (2018.02)

(56) References Cited

U.S. PATENT DOCUMENTS

| | | | |
|---|---|---|---|
| 2009/0170608 A1* | 7/2009 | Herrmann | G06Q 30/02 463/42 |
| 2009/0199107 A1* | 8/2009 | Lewis | G06Q 30/0241 715/745 |
| 2011/0161076 A1* | 6/2011 | Davis | G06F 3/04842 704/231 |
| 2012/0066234 A1* | 3/2012 | Lee | G06F 17/30867 707/749 |
| 2012/0221411 A1* | 8/2012 | Graham, Jr. | G06Q 30/02 705/14.52 |
| 2012/0311030 A1* | 12/2012 | Lin | G06F 15/16 709/204 |
| 2013/0265178 A1* | 10/2013 | Tengler | H04W 4/00 340/989 |

* cited by examiner

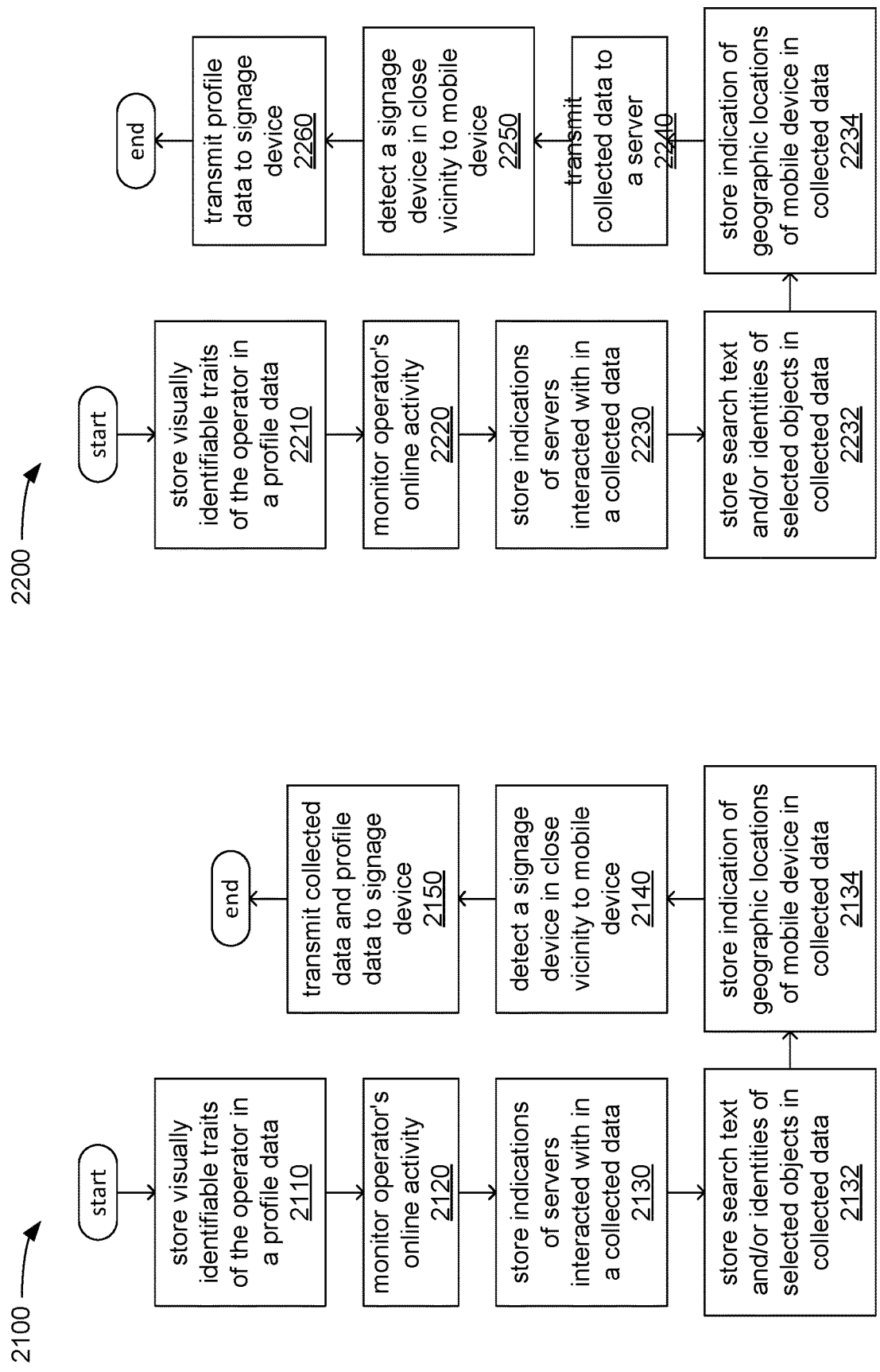

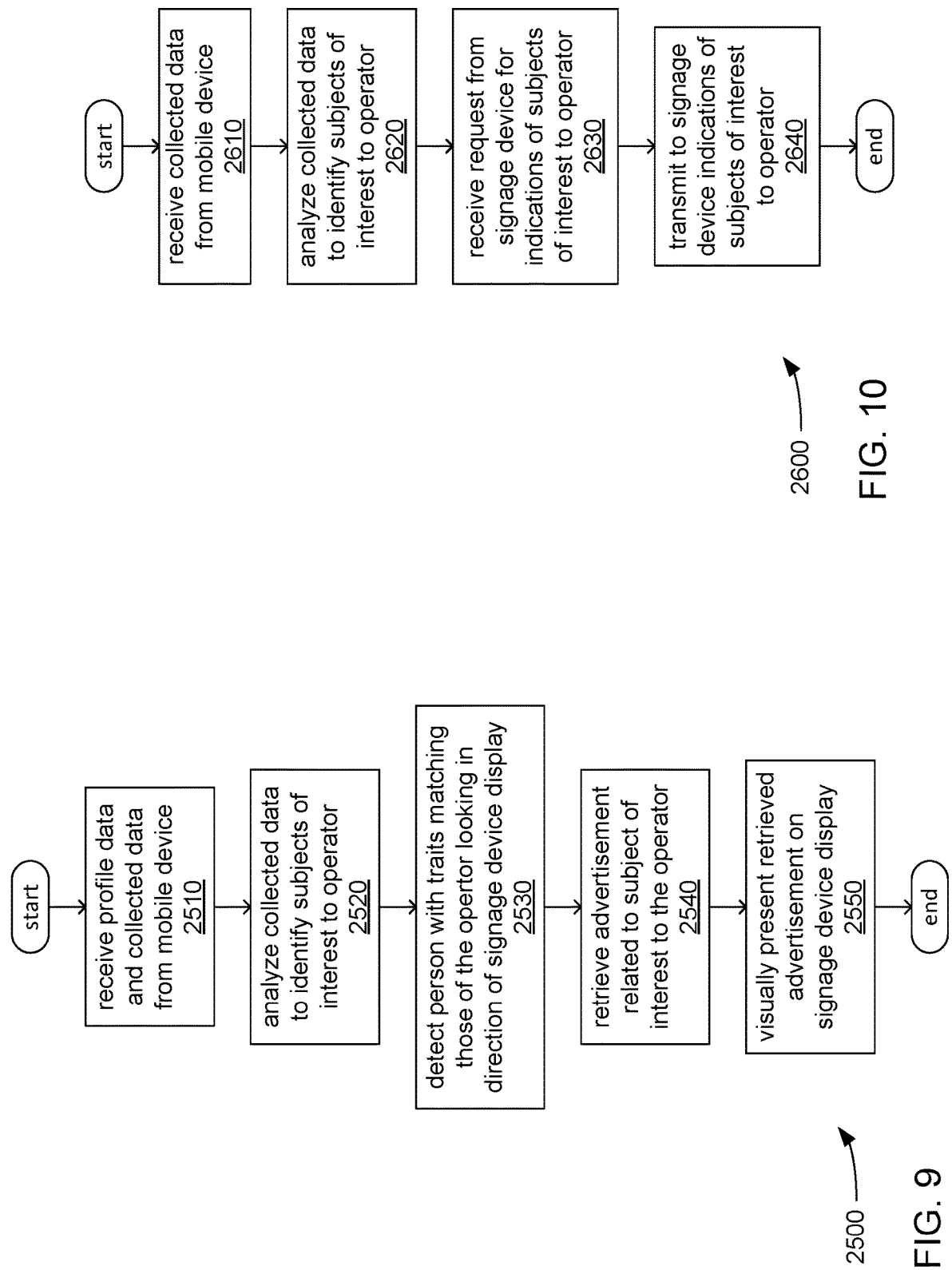

US 10,614,488 B2

DIGITAL SIGN ADVERTISEMENT SELECTION BASED ON MOBILE DEVICE ACTIVITY

CROSS-REFERENCE TO RELATED APPLICATIONS

This application is a continuation of, claims the benefit of and priority to previously filed U.S. patent application Ser. No. 13/629,695 filed Sep. 28, 2012, entitled "DIGITAL SIGN ADVERTISEMENT SELECTION BASED ON MOBILE DEVICE ACTIVITY", the subject matter of which is incorporated herein by reference in its entirety.

BACKGROUND

Digital signs employing cameras and video analytics techniques to identify and employ traits of individuals looking at such signs to better target advertisements towards those individuals are fast making their debut in malls, shops, courtyards and other public spaces. The ability to visually identify traits such as age, gender, etc. has proven advantageous in selecting advertisements that are statistically most likely to be of interest to particular groups of persons having particular combinations of traits. This is in addition to other longer standing advantages of digital signs over traditional fixed-presentation signs such as the ability to play motion video, the ability to have advertisements remotely updated via a network, the ability to have the advertisements change with the hour of the day or the day of the week, etc.

However, relying solely on such features, including the ability to employ a combination of such visually identifiable traits and such statistical data in selecting advertisements to visually present goes only so far in targeting advertisements to a particular person who happens to be looking in the direction of a particular digital sign in a particular place at a particular time. Each person is, of course, an individual who likely has at least some interests that are not likely to be captured in the statistical data. Further, those interests are apt to change hourly and/or daily as that individual engages in various work-related and leisure-related pursuits. As a result, such interests are highly unlikely to be successfully targeted by advertisements selected using such statistical data.

BRIEF DESCRIPTION OF THE DRAWINGS

FIG. 5 illustrates an embodiment of a first logic flow.

FIG. 6 illustrates an embodiment of a second logic flow.

FIG. 9 illustrates an embodiment of a fifth logic flow.

FIG. 10 illustrates an embodiment of a sixth logic flow.

DETAILED DESCRIPTION

Figure 1:
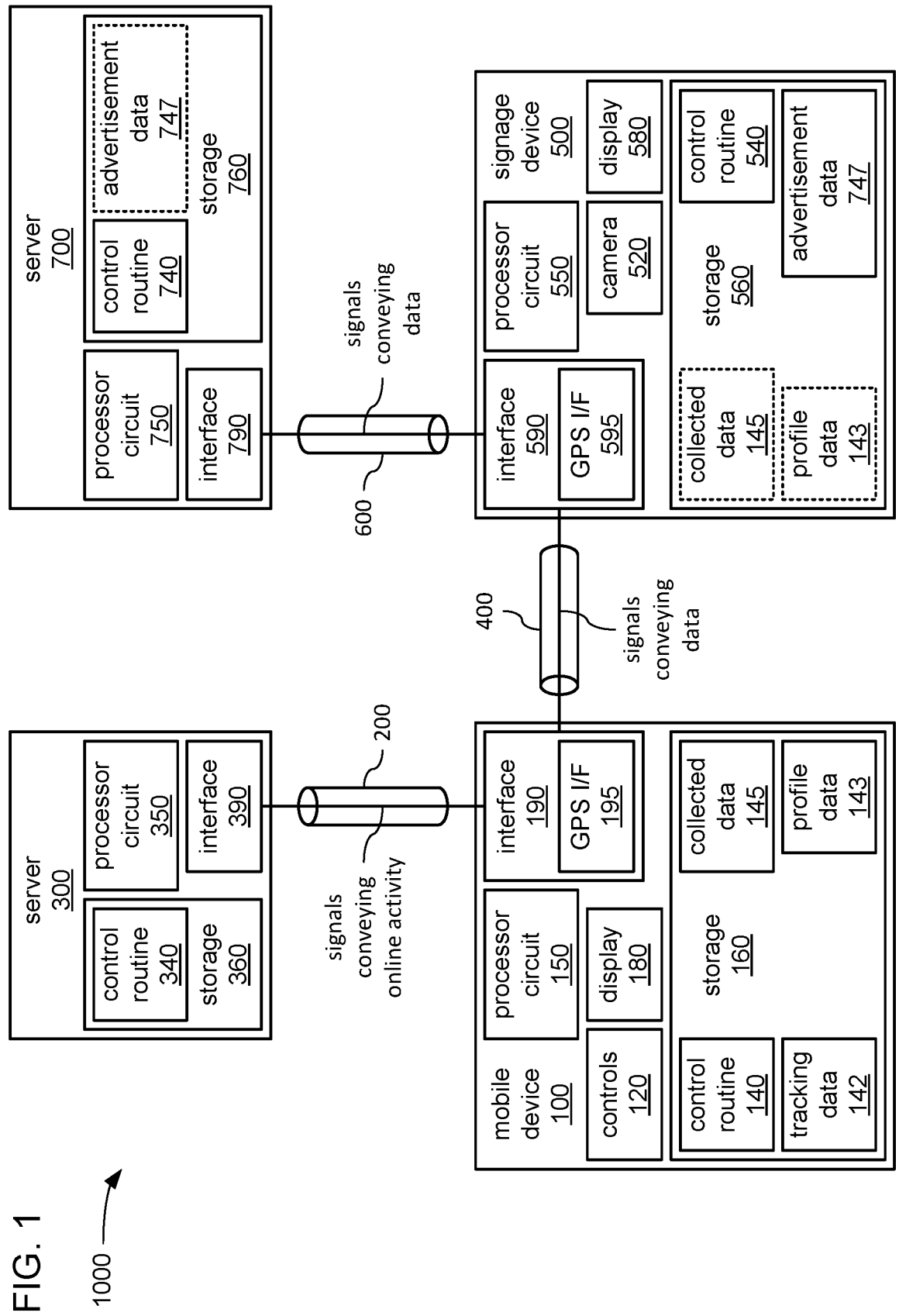
FIG. 1 illustrates a first embodiment of interaction among computing devices.

Various embodiments are generally directed to cooperation among computing devices to employ both visually identifiable traits of a person and data concerning their online activities to determine subjects of interest to that individual and to select information (e.g., advertisements) to visually present to that individual based on those interests. Some embodiments are particularly directed to interaction among two or more computing devices to cause the selection and visual presentation of particular advertisements on a display of one of the computing devices in response both to the receipt of data concerning online use of that other computing device by its operator and to detecting that a person fitting visually identifiable characteristics of the operator is currently looking in the direction of that display.

More specifically, one or both of a signage device and a mobile device detect that they have entered into close enough vicinity to each other that it can be assumed that the operator of the mobile device is close enough to the signage device to possibly view a display of the signage device and any advertisement visually presented thereon. In response, amidst an exchange of data between the mobile device and the signage device, the signage device is provided with data collected over time concerning the operator's use of the mobile device in online activities (e.g., activities involving communication with other computing devices via a network and/or the Internet). The signage device also monitors a camera and analyzes video imagery captured thereby to recurringly detect whether or not a person having visually identifiable traits matching known traits of the operator of the mobile device is currently looking in the direction of the display. In response to determining that such a person is currently looking in the direction of the display such that it is possible that the operator of the mobile device is looking in the direction of the display, the signage device employs the collected data concerning that operator to select and visually present advertisements to that person.

In one embodiment, for example, an apparatus comprises a processor circuit; an interface operative to communicatively couple the processor circuit to a network; and a storage communicatively coupled to the processor circuit and arranged to store a sequence of instructions operative on the processor circuit to: monitor online activities comprising interactions with a computing device via the interface and the network; store collected data about the online activities; store profile data comprising visually identifiable traits; detect a signage device; and form a link with the signage device via the interface and transmit the profile data to the signage device via the link in response to detection of the signage device. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a digital signage system 1000 comprising one or more of a mobile device 100, a server 300, a signage device 500 and possibly another server 700. Each of these computing devices 100, 300, 500 and 700 may be any of a variety of types of computing device, including without limitation, a desktop computer system, a data entry terminal, a laptop computer, a netbook computer, a tablet computer, a handheld personal data assistant, a smartphone, a body-worn computing device incorporated into clothing, a computing device integrated into a vehicle (e.g., a car, a bicycle, etc.), a server, a cluster of servers, a server farm, etc.

As depicted, the mobile device 100 and the server 300 exchange signals conveying online activity of the operator of the mobile device 100 via a link 200, the mobile device 100 and the signage device 500 exchange signals conveying data concerning the operator of the mobile device 100 via a link 400, and the signage device 500 and the server 700 (if present) exchange signals conveying data concerning advertisements for visual presentation via a link 600. Each of the links 200, 400 and 600 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. It is envisioned that one or more of these links are implemented as channels of communication (e.g., virtual private network (VPN) channels or other forms of virtual channels) formed between computing devices through portions of the Internet.

In various embodiments, and as will be explained in greater detail, an operator of the mobile device 100 uses the mobile device 100 to engage in online activities involving interactions between the mobile device 100 and one or more servers through a network, such as the server 300 through the link 200. Examples of such interactions may entail browsing a website hosted by the server 300, requesting the server 300 to perform a financial or other transaction, sending and/or receiving email through the server 300, searching for information employing a search routine executed by the server 300, etc. As the operator operates the mobile device 100 to engage in online activities, data concerning these online activities such as IP addresses of servers interacted with, uniform resource locators (URLs) of websites visited, etc. are monitored and stored by the mobile device 100, ultimately becoming included in a collected data 145. Also, texts of terms searched employing search routines, names of locations entered while using online maps, etc. are monitored and included in the collected data 145. Further, a global positioning system (GPS) interface 195 of the mobile device 100 may be employed to recurringly receive wireless signals emanating from satellites to aid in determining where the mobile device 145 is carried by the operator, and such location data may also be included in the collected data 145.

The mobile device 100 recurringly attempts to locate networks in its vicinity with which to establish communications as the mobile device 100 is carried about by the operator in an effort to locate signage devices. In response to the mobile device 100 being carried into close enough vicinity to the signage device 500 for one or both to detect the other, the mobile device 100 and the signage device 500 form the link 400 therebetween, and then the mobile device 100 transmits the collected data 145 to the signage device 500. As will shortly be explained, the signage device 500 employs the collected data 145 as an input to selecting advertisements to visually present.

In various embodiments, the mobile device 100 comprises a storage 160 storing a control routine 140, a tracking data 142, a profile data 143 and/or the collected data 145; a processor circuit 150; controls 120; a display 180; and an interface 190 possibly comprising the GPS interface 195 and coupling the initiating device 100 variously to the server 300 and the signage device 500 via the links 200 and 400, respectively. It is envisioned that the mobile device 100 is likely to be a relatively portable computing device able to be carried on the person of its operator (e.g., a smartphone, a personal data assistant (PDA), a tablet computer, a wearable computer, etc.). It is therefore further envisioned that the links 200 and 400 that the mobile device 100 forms at various times with the server 300 and the signage device 500, respectively, are likely to be wireless links.

In executing a sequence of instructions of at least the control routine 140, the processor circuit 150 is caused to employ the controls 120 and the display 180 in providing an operator interface to the operator of the mobile device 100 that enables the operator to operate the mobile device 100 to engage in online interactions with other computing devices (e.g., the server 300) through the mobile device 100. As these online interactions take place, the processor circuit 150 is caused to monitor keystrokes of text entered by the operator via the controls 120 (e.g., where the controls 120 comprise a keyboard or keypad), and/or to monitor what objects visually presented on the display 180 are selected by the operator through operation of the controls 120 (e.g., where the controls 120 comprise a pointing device, such as a mouse, touchpad or touchscreen, enabling selection of visually presented objects). Such text and/or identifying information of selected objects are aggregated and stored as the collected data 145.

The processor circuit 150 is also caused by the control routine 140 to monitor what servers are interacted with by the operator through the mobile device 100, storing identifying information concerning those servers (e.g., Internet protocol (IP) addresses or URLs) as the tracking data 142. It may be that the tracking data 142 comprises so called "cookies" provided by servers to the mobile device 100 for storage as a record of aspects of activity between the mobile device 100 and those servers for various purposes related to services provided by those servers, as those skilled in the art will readily recognize. Regardless of the exact form of the tracking data 142, the processor circuit 150 is caused to incorporate at least a subset of the tracking data 142 into the collected data 145.

The processor circuit 150 may have also been caused, at an earlier time, to prompt the operator for various pieces of personal information concerning the operator (e.g., name, address, contact information, a photographic image, etc.) that includes various visually identifiable traits of the operator, such as age and/or gender, and then to store such personal information as the profile data 143. In embodiments where the interface 190 includes the GPS interface 195, the processor circuit 150 is caused to operate the GPS interface 195 to receive wireless signals from satellites, and then use those signals to identify locations to which the operator carries the mobile device 100. The processor circuit 150 may be further caused to store indications of such locations as part of the collected data 145.

Aside from monitoring and storing details of online activity involving the mobile device 100, the processor circuit is also caused to operate the interface 190 to monitor for instances of the mobile device entering into a close enough vicinity with a signage device (e.g., the signage device 500) to form a link therebetween (e.g., the link 400). In some embodiments, the interface 190 (or a component thereof) may employ a wireless signaling technology with a relatively limited range to detect a signage device employing similar signaling technology, such that if a signage device is so detected, then that signage device can be assumed by the processor circuit 150 to be in relatively close distance to the current location of the mobile device 100. In other embodiments where the interface 190 includes the GPS interface 195, the processor circuit 150 may be caused to monitor the GPS interface 195 for instances of the mobile device 100 entering into a close proximity of coordinates designating a known geographic location of a signage device. In such an embodiment, coordinates designating known geographic locations of digital signs may be provided to the mobile device 100 by a server and/or may be recorded over time as the mobile device 100 encounters signage devices.

Upon formation of the link 400, the processor circuit 150 is caused by the control routine 140 to transmit the collected data 145 and at least a portion of the profile data 143 that includes visually identifiable traits of the operator, to the signage device 500 to enable the signage device 500 to select advertisements to visually present that have a relatively higher likelihood of being of interest to the operator. However, the processor circuit 150 may also be caused to operate the interface 190 to receive information concerning the signage device 500, its location, and/or the advertisements that it selects for visual display to the operator, and to store this received information as part of the collected data 145. Alternatively or additionally, where the interface 190 comprises the GPS interface 195, the processor circuit 150 may be caused to record coordinates specifying the geographic location at which the mobile device 100 encountered the signage device 500.

In various embodiments, the signage device 500 comprises a storage 560 storing a control routine 540, advertisement data 747, and at various times, the collected data 145 and the profile data 143; a processor circuit 550; a camera 520; the display 580; and an interface 590 possibly comprising a GPS interface 595 and coupling the signage device 500 variously to the mobile device 100 and the server 700 (if present) via the links 400 and 600, respectively. It is envisioned that the signage device 500 is likely to be a relatively stationary computing device that visually presents advertisements based on analysis of video to detect various traits of persons looking in the direction of the display 580 of the signage device, and further based on information received from computing devices carried by those people, when possible. Therefore, it is envisioned that the signage device 500 will function in at least two distinct modes—one mode for when data concerning a particular person within the vicinity of the signage device 300 is not available, and another mode for when such data is available.

Where the signage device 500 is not provided with access to information concerning online activities coupled with visually identifiable traits of a particular person (e.g., the combination of the collected data 145 and the profile data 143), the signage device 500 relies upon video analysis to identify categories of persons looking in the direction of the display 580 to select advertisements for visual presentation thereon. The camera 520 is positioned relative to the display 580 to enable a view of the faces of persons in front of the display 580. The processor circuit 550 is caused by the control routine 540 to monitor the camera 520 and to employ video analytics techniques that will be familiar to those skilled in the art to distinguish people from other objects in the view of the camera 520, to distinguish people looking in the direction of the display 580 from those who are not, and to identify various visually identifiable traits of persons looking in the direction of the display 580 (e.g., age, gender, etc.). With such traits of persons looking in the direction of the display 580 identified, the processor circuit 580 is further caused by the control routine 540 to select advertisements stored in the advertisement data 747 that are designated as mostly likely to be of interest to persons having those traits, and to visually present those advertisements on the display 580.

Over time, as the visually identifiable traits of persons looking in the direction of the display 580 change, the processor circuit 580 is caused to change the advertisements visually presented on the display, accordingly. Where multiple people having different visually identifiable traits are determined to all be looking in the direction of the display 580 at the same time, the processor circuit 580 may be caused by the control routine 540 to alternately display advertisements appropriate to different ones of those multiple persons, possibly in a more rapid succession, in an effort to visually present advertisements deemed likely to be of greater to each of them during the time that they are all looking in the direction of the display 580. Where the server 700 is also present, the signage device 500 may receive the advertisement data 747, along with updates thereto, from the server 700 via the link 600. It is envisioned that the selection of advertisements making up the advertisement data 747 may be remotely changed in this manner based on where the signage device 500 is located, what range of products and/or services are desired by an operator of the signage device 500 to have advertised (possibly in coordination with a promotion), and/or possibly other considerations such as changes in seasons, time of day and/or day of week.

Where the signage device 500 is provided with access to information concerning online activities linked to visually identifiable traits of a particular person (e.g., the combination of the collected data 145 and the profile data 143 concerning the operator of the mobile device 100), the signage device 500 relies upon a combination of such information about that particular person and video analysis to identify categories of persons looking in the direction of the display 580 of the signage device 500 to select advertisements for visual presentation thereon. The processor circuit is caused to operate the interface 590 to monitor for instances of a mobile device (e.g., the mobile device 100) entering into a close enough vicinity with the signage device 500 to form a link therebetween (e.g., the link 400). In some embodiments, the interface 590 (or a portion thereof) may employ a wireless signaling technology with a relatively limited range to detect a mobile device, such that if a mobile device employing a similar wireless technology is detected, then that mobile device can be assumed by the processor circuit 550 to be in relatively close distance to the location of the signage device 500.

Upon formation of the link 400, the processor circuit 550 is caused by the control routine 540 to operate the interface 590 to receive the collected data 145 and at least a portion of the profile data 143 that includes visually identifiable traits of the operator of the mobile device 100 from the mobile device 100. For as long as the link 400 continues to be formed between the mobile device 100 and the signage device 500, the processor circuit 550 is caused to continue to assume that the mobile device 100 is in close vicinity to the signage device 500, and thereby assume that the operator of the mobile device 100 is in close vicinity to the signage device 500 such that the operator might look at the display 580. In response, the processor circuit 550 is caused to recurringly analyze video received from the camera 520 for instances of a person looking in the direction of the display 580 who has visible traits matching the visible traits indicated in the profile data 143 as being those of the operator of the mobile device 100. Upon the occurrence of such instances, the processor device 550 is caused to select and visually present advertisements stored as part of the advertisement data 747 on the display 580 that are deemed likely to be of interest to the operator of the mobile device 100 based on the indications of the operator's online activities within the collected data 145.

The processor circuit analyzes the collected data 145 to discern patterns of online activity on the part of the operator of the mobile device 100 that are indicative of a relatively high degree of interest in particular subjects, especially online activities that are indicative of the operator acting on their interest in those particular subjects. By way of example, the operator of the mobile device 100 may make use of a website providing online searches to search for information concerning a wide range of subjects, but subjects that the operator has performed repeated searches for, especially if they've done so over a relatively long period of time, are assumed to be subjects in which the operator has greater interest than the others. By way of another example, where the operator of the mobile device 100 has searched for various subjects, but then subsequently made an online purchase of a product or service related to just one of those subjects, then that one subject is assumed to be of greater interest than the others. By way of still another example, where the operator of the mobile device 100 has searched for a location where a subject of interest to them may be found, and then the operator has arrived in the vicinity of the signage device 500 where there is a connection of that subject to that location, then that subject is assumed to be of greater interest to the operator. Additionally or alternatively, the processor circuit analyzes the collected data 145 to discern the subjects of online activities that are more recent than others, especially subjects that are connected to multiple instances of online activities conducted shortly before coming into the vicinity of the signage device 500. By way of example, the operator may have engaged in online activities earlier in the same day concerning multiple subjects, but with one particular subject at the focus of multiple online activities, especially where that subject is connected with a search of locations that appears to lead the operator to the vicinity of the signage device 500.

It should be noted that the signage device 500 must alternate between these two modes given that not all persons who are detected as looking in the direction of the display 580 are likely to be carrying mobile devices that will provide the signage device 500 with data concerning their online activities coupled with visually identifiable traits. Specifically, instances may arise where multiple people are determined by the processor circuit 550 to be looking in the direction of the display 580 at the same time, but where less than all of them carry mobile devices providing the signage device with such data. The processor circuit 580 may be caused to respond to this by alternately visually presenting advertisements selected in a manner for the ones of those people for which such data is not provided that differs from the ones of those people for which such data is provided. Specifically, for those persons for whom such data is not provided, the processor circuit 550 relies on correlating their visually identified traits with advertising from the advertising data 747 that is deemed more likely to be of interest to persons having those traits. But, for those persons for whom such data is provided, the processor circuit 550 relies on the provided indications of their online activities coupled with the provided indications of their visually identifiable traits to select advertisements in response to detecting instances in which persons identified as having those visually identifiable traits are determined to be looking in the direction of the display 580.

Further, the processor circuit 550 may be caused to do more than just receive the collected data 145 and the profile data 143. Where the interface 590 comprises the GPS interface 595, the processor circuit 550 may be further caused to transmit coordinates of the geographic location of the signage device 500 (as obtained by the processor circuit 550 through use of the GPS interface 595 to receive signals from satellites) via the link 400 to the mobile device 100 to enable the mobile device 100 to augment the collected data 145 with information concerning the fact of the mobile device 100 having been brought to the vicinity of the signage device 500.

In various embodiments, the server 300 comprises a processor circuit 350, an interface 390 coupling the server 300 to the mobile device 100 via the link 200, and a storage 360 storing a control routine 340. In executing a sequence of instructions of at least the control routine 340, the processor circuit 350 is caused to operate the interface 390 to engage in online activities with the mobile device 100 via the link 200 under the control of the operator of the mobile device 100.

In various embodiments, the server 700 (if present) comprises a processor circuit 750, an interface 790 coupling the server 700 to the signage device 500 via the link 600, and a storage 760 storing a control routine 740 and the advertisement data 747. In executing a sequence of instructions of at least the control routine 740, the processor circuit 750 is caused to operate the interface 790 to provide the signage device 700 with updates to the advertisement data 747, as stored in the storage 560 of the signage device 500, on a recurring basis. It is envisioned that the server 700 is associated with an entity (commercial, non-profit, governmental, etc.) providing products and/or services that is also associated with the signage device 500, but which may or may not be associated with the server 300.

In various embodiments, each of the processor circuits 150, 350, 550 and 750 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5C), Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160, 360, 560 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390, 590 and 790 employ any of a wide variety of signaling technologies enabling each of computing devices 100, 300, 500 and 700 to be coupled through the links 200, 400 and 600 as has been described. Each of these interfaces comprises circuitry providing at least some of the requisite functionality to enable such coupling. However, each of these interfaces may also be at least partially implemented with sequences of instructions executed by corresponding ones of the processor circuits 150, 350, 550 and 750 (e.g., to implement a protocol stack or other features). Where one or more of the links 200, 400 and 600 employs electrically and/or optically conductive cabling, one or more of the interfaces 190, 390, 590 and 790 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the links 200, 400 and 600 employs wireless signal transmission, one or more of the interfaces 190, 390, 590 and 790 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 390 and 790 are depicted as a single block, and although the GPS interfaces 195 and 595 are the only specific interface components depicted in each of the interfaces 190 and 590, one or more of these interfaces may comprise multiple interface components that may be based on differing signaling technologies. This may be the case especially where one or more of these interfaces couples corresponding ones of the computing devices 100, 300, 500 and 700 to more than one network, each employing differing communications technologies.

In various embodiments, the controls 120 may comprise any of a variety of types of manually-operable controls, including without limitation, lever, rocker, pushbutton or other types of switches; rotary, sliding or other types of variable controls; touch sensors, proximity sensors, heat sensors or bioelectric sensors, etc. The controls 120 may comprise manually-operable controls disposed upon a casing of corresponding ones of the computing device 100, and/or may comprise manually-operable controls disposed on a separate casing of a physically separate component of corresponding ones of these computing devices (e.g., a remote control coupled to other components via infrared signaling). Alternatively or additionally, the controls 120 may comprise any of a variety of non-tactile operator input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, each of the displays 180 and 580 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing devices 100 and 500, or may be disposed on a separate casing of a physically separate component of corresponding ones of these computing devices (e.g., a flat panel monitor coupled to other components via cabling).

Figure 2:
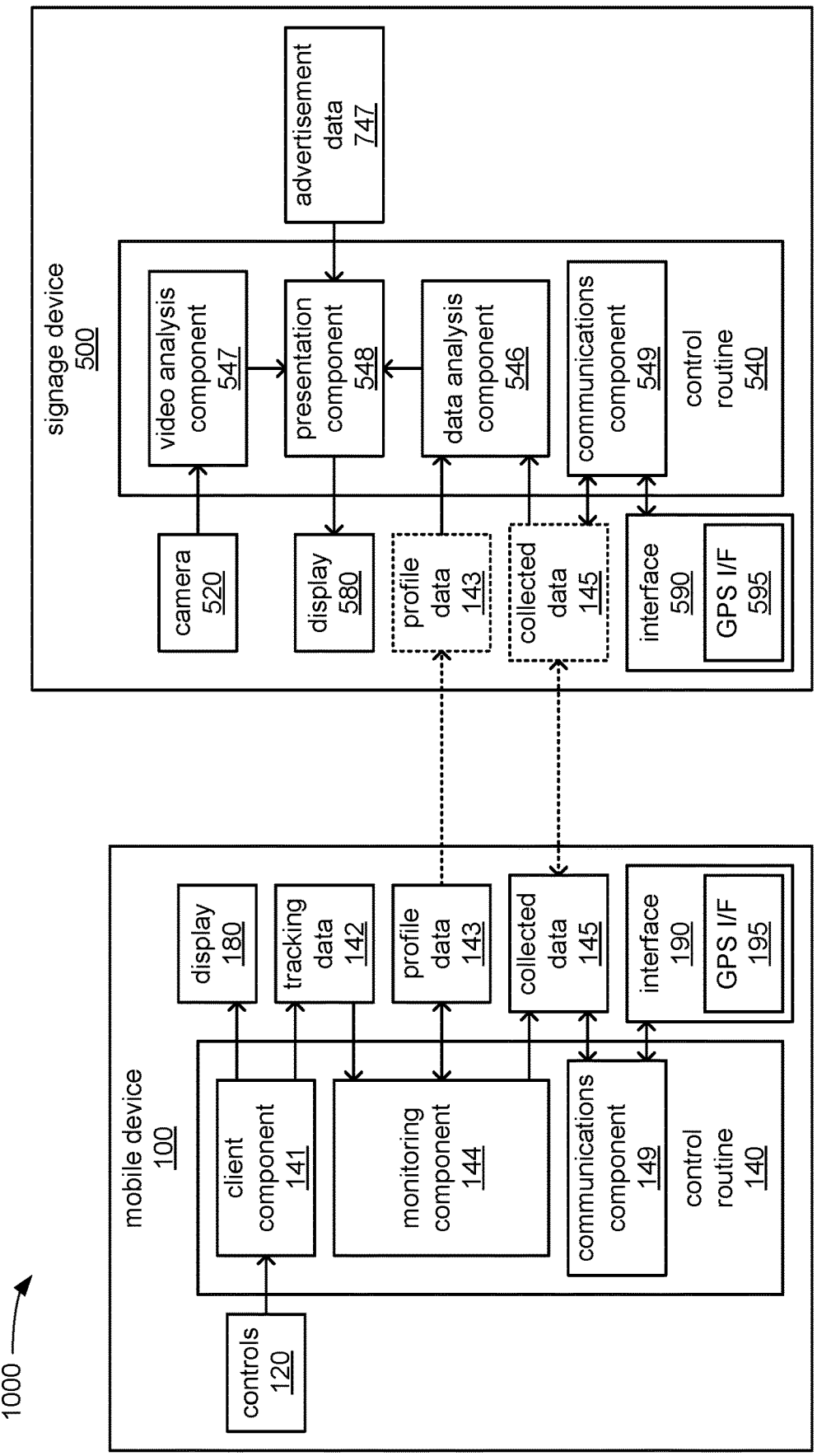
FIG. 2 illustrates a portion of the embodiment of FIG. 1.

FIG. 2 illustrates a block diagram of a portion of the block diagram of FIG. 1 in greater detail. More specifically, aspects of the operating environments of the mobile device 100 and the signage device 500, in which their respective processor circuits 150 and 550 (shown in FIG. 1) are caused by execution of their respective control routines 140 and 540 to perform the aforedescribed functions are depicted. As will be recognized by those skilled in the art, each of the control routines 140 and 540, including the components of which each is composed, are selected to be operative on whatever type of processor or processors that are selected to implement each of the processor circuits 150 and 550.

In various embodiments, one or more of the control routines 140 and 540 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150 and 550, including without limitation, Windows™, OS X™ Linux®, or Android OS™. Where one or more device drivers are included, those device drivers may provide support for any of a variety of other components, whether hardware or software components, that comprise one or more of the computing devices 100 and 500.

The control routine 140 comprises a client component 141 and a monitoring component 144 executable by the processing circuit 150 both to use the mobile device 100 to engage in online activity with other computing devices via one or more links of a network and/or the Internet and to monitor that online activity. The client component 141 cooperates with the controls 120 and the display 180 (and/or possibly other input/output devices such as a microphone or speakers) to provide an operator interface for operation of the mobile device 100 by its operator. The client component 141 may be one or more of a web browser, a data file viewer, a text editor, a terminal emulator, an instant messaging client, an email communications client, etc. Thus, the client component 141 provides a remote operator interface for online activity conducted with another computing device, such as the server 300, which may be one or more of a website host, a file server, an email relay, etc. The monitoring component 144 monitors and records this online activity, creating the collected data 145 that is later provided to the signage device 500, as has been described.

It is envisioned that the operator of the mobile device 100 would give his/her consent to the installation and/or operation of the monitoring component 144 monitoring their online activities in exchange for the assistance that would be provided to the operator in locating places of interest, products, services, discount pricing on any of a number of things of interest, etc. In embodiments where the client component 141 comprises a web browser, the monitoring component 144 may be installable by the operator in a manner linked to the client component 141 as a "browser add-on" or "browser extension" downloaded from a server. Upon installation, the monitoring component 144 may request that the operator provide some information about themselves to create the profile data 143 (e.g., name, address, contact information, etc.) that also includes visually identifiable traits (e.g., age, gender, etc.). As has been described, at least a portion of the profile data 143 is provided to the signage device 500 along with the collected data 145, and in some embodiments, the monitoring component 144 may cause the processor 150 to present the operator with the option of providing only visually identifiable traits of the operator (e.g., age and gender) to the signage device 500 from the profile data 143, or to also provide information that would more directly identify the operator to the signage device 500 (e.g., name, address, contact information, etc.).

As will be familiar to those skilled in the art, it is common for web browsers, email clients and/or other routines typically employed by persons engaging in online activities to locally store data that maintains a record of aspects of those online activities (e.g., so-called "cookies"). Thus, it is envisioned that where the client component 141 comprises such a routine, use of the client component 141 would likely generate and recurringly add content to the tracking data 142, thereby creating and maintaining a record of servers, websites, etc. that have been interacted with. It may be that the monitoring component 144 recurringly parses the tracking data 142 to obtain information concerning servers, website, etc. interacted with in those online activities, and stores such information as part of the collected data 145. Alternatively, it may be that the monitoring component 144 more directly monitors aspects of the execution of the client component 141 to obtain such information. Further, the monitoring component 144 monitors the operator's keystrokes and/or the identities of visually displayed objects that are selected by the operator, as has been described, and stores such information as part of the collected data 145.

Each of the control routines 140 and 540 comprises a communications component 149 and 549, respectively, executable by corresponding ones of the processing circuits 150 and 550 to operate corresponding ones of the interfaces 190 and 590 to transmit and receive signals variously via the links 200, 400 and 600 as has been described. As will be recognized by those skilled in the art, each of the communications components 149 and 549 are selected to be operable with whatever type of interface technology is selected to implement each of the interfaces 190 and 590.

In some embodiments, the communications component 149 causes the processor circuit 150 to operate the interface 190 to seek signage devices within a relatively close vicinity to the mobile device 100 through use of a relatively short range wireless technology such that when the signage device 500 is detected, an assumption is made that the signage device 500 must be relatively near to the mobile device 100. Correspondingly, in such embodiments, the communications component 549 causes the processor circuit 550 to operate the interface 590 to seek mobile devices within a relatively close vicinity to the signage device 500 also through use of a relatively short range wireless technology such that when the mobile device 100 is detected, a similar assumption concerning the distance between the mobile device 100 and the signage device 500 is made. With the detection of at least one of these computing devices by the other, the processors 150 and 550 are caused by the communications components 149 and 549 to operate the interfaces 190 and 590, respectively, to form the link 400 (shown in FIG. 1) therebetween. With the link 400 formed, the processor 150 is caused to operate the interface 190 to transmit the collected data 145 and at least a portion of the profile data 143 (again, possibly only visually identifiable traits of the profile data 143) to the signage device 500.

As previously discussed, the signage device 500 may operate in either of two modes depending on whether the signage device 500 has been provided with data concerning online activities of a person coupled with their visually identifiable traits by a mobile device in relatively close vicinity to the signage device 500 such that the person is also in relatively close vicinity such that they may look in the direction of the display 580.

The control routine 540 comprises a video analysis component 547 and a presentation component 548. Where the signage device has not received data concerning online activities of a person coupled with their visually identifiable traits, the video analysis component recurringly analyzes video captured by the camera 520 to identify persons looking in the direction of the display 580 and to identify various traits about them from that video, such as age and gender. The presentation component causes the processor circuit 550 to employ those identified traits in retrieving advertisements from the advertisement data 747 that are deemed statistically more likely to be of interest to persons having those identified traits, and the processor circuit 550 is further caused to visually present those advertisements on the display 580, as has been described.

However, the control routine 540 also comprises a data analysis component 546. Where the signage device 500 has received data concerning online activities of a person coupled with their visually identifiable traits (e.g., the combination of the collected data 145 and at least part of the profile data 143 from the mobile device 100), the data analysis component 546 analyzes that data to identify one or more subjects of interest to that person. Also, the presentation component 548 recurringly compares the visually identifiable traits of the received portion of the profile data 143 to traits identified by the video analysis component 547 as associated with persons detected as looking in the direction of the display 580. These comparisons are to detect instances in which a person for whom such data has been received may be among one or more persons looking in the direction of the display 580. Upon detecting such instances, the presentation component 548 selects advertisements from among those stored in the advertisement data 747 that relate to the one or more subjects of interest to that person, and causes the processor circuit 550 to visually present them on the display 580.

In one example embodiment, the mobile device 100 is smart phone owned by an operator who occasionally uses it to engage in online activities with other computing devices via various networks and/or the Internet, including the server 300 via the link 200. The server 300 hosts a website frequently accessed by the operator via the mobile device 100 and the link 200 to perform searches for various things of interest to the operator via a search engine of the server 300. In accessing the website, the operator operates controls 120 and views the display 180 of the, while making use of the client component 141. As is commonplace with many websites, the operator's accesses to the website hosted by the server 300 results in the client component 141 causing the processor circuit 150 to create and recurring augment the tracking data 142 reflecting aspects of the operator's online activities in conjunction with the website.

At an earlier time, the operator had agreed to the installation of the monitoring component 144 on the mobile device 100, the monitoring component 144 being stored in the storage 160 and becoming part of the control routine 140. As part of installation of the monitoring component 144, the processor circuit 150 is caused by the monitoring component 144 to request various pieces of personal information of the operator, including visually identifiable traits of the operator, and stores that personal information as part of the profile 143. As the operator operates the mobile device 100 to engage in online activities making use of the client component 141, the monitoring component 144 monitors keystrokes and selections of visually presented objects of the operator, and stores such information as the collected data 145. The monitoring component 144 also parses the tracking data 142 to obtain indications of servers, websites, etc. interacted with, and includes that information in the collected data 145.

On a particular day, the operator operates the mobile device 100, possibly at home or at work, to search for types, models and vendors of full-spectrum compact fluorescent (CFL) bulbs to use as replacements for old incandescent bulbs that have burned out in the operator's home. The fact of the operator having accessed the search engine website hosted by the server 300 is stored in the collected data along with the various pieces of search text employed by the operator in searching various aspects of full-spectrum CFL bulbs. The operator may be lead by the search engine to various other websites hosted by other servers providing product information, entries in online encyclopedias about characteristics of such bulbs and/or locations of stores in the operator's geographic area or online where such bulbs might be purchased.

Having identified a local store at which such bulbs may be available, the operator travels to that store, bringing the mobile device 100. Upon arriving at the store, the operator comes into relatively close vicinity to the signage device 500, thereby enabling the mobile device 100 and the signage device 500 to detect each other and form the link 400. Following formation of the link 400, the mobile device 100 transmits the collected data 145 and at least a portion of the profile data 143 that includes visually identifiable traits of the operator to the signage device 500 via the link 400. The processor circuit 550 is caused by the data analysis component 546 to analyze the collected data 145 to identify one or more subjects of interest to the operator, and in so doing, the full-spectrum CFL bulbs are determined to be of interest to the operator as a result of the operator's online searching and other online activities concerning that subject.

At about the same time as the operator comes into the vicinity of the signage device 500 so does another person who is either not carrying a computing device or who is carrying a computing device that does not provide the signage device 500 with information about the other person's online activities or visually identifiable traits. The processor circuit 550 is caused by the video analysis component to monitor the camera 520 to distinguish persons from other objects in view of the camera 520, to distinguish persons looking in the direction of the display 580 from those who are not, and to identify visually identifiable traits of the persons looking in the direction of the display 580. As both the operator of the mobile device 100 and the other person come into view and look in the direction of the display 580, the processor circuit 550 is caused to recognize each of them as a person looking in the direction of the display 580, and to identify each of their visually identifiable traits, including the age and gender of each.

The visually identifiable traits of the operator provided by the profile data 143 are compared to the visually identifiable traits of both persons identified by the video analysis component as being persons looking in the direction of the display 580, and one of those persons is found to have traits that match those received in the profile data 143. As a result, that one of those persons is deemed likely to be the operator, and the processor circuit 550 is caused by the presentation component 548 to select and visually present on the display 580 an advertisement from among those stored in the advertisement data 747 concerning a promotional price currently being offered for light bulbs at one of the stores in the area. Also, the visually identifiable traits of the other of those persons, having been found to not match the visually identifiable traits provided in the profile data 143, are used by the presentation component 548 to retrieve an advertisement from among the advertisement data 747 that is deemed statistically likely to be of interest to persons having those traits, and to visually present that advertisement on the display 580, also. Given that two persons have been identified as both looking in the direction of the display 580 at the same time, the presentation component 548 causes the processor 550 to alternately display the two advertisements, thereby allowing each of the two persons to be presented with an advertisement targeted at them.

Figure 3:
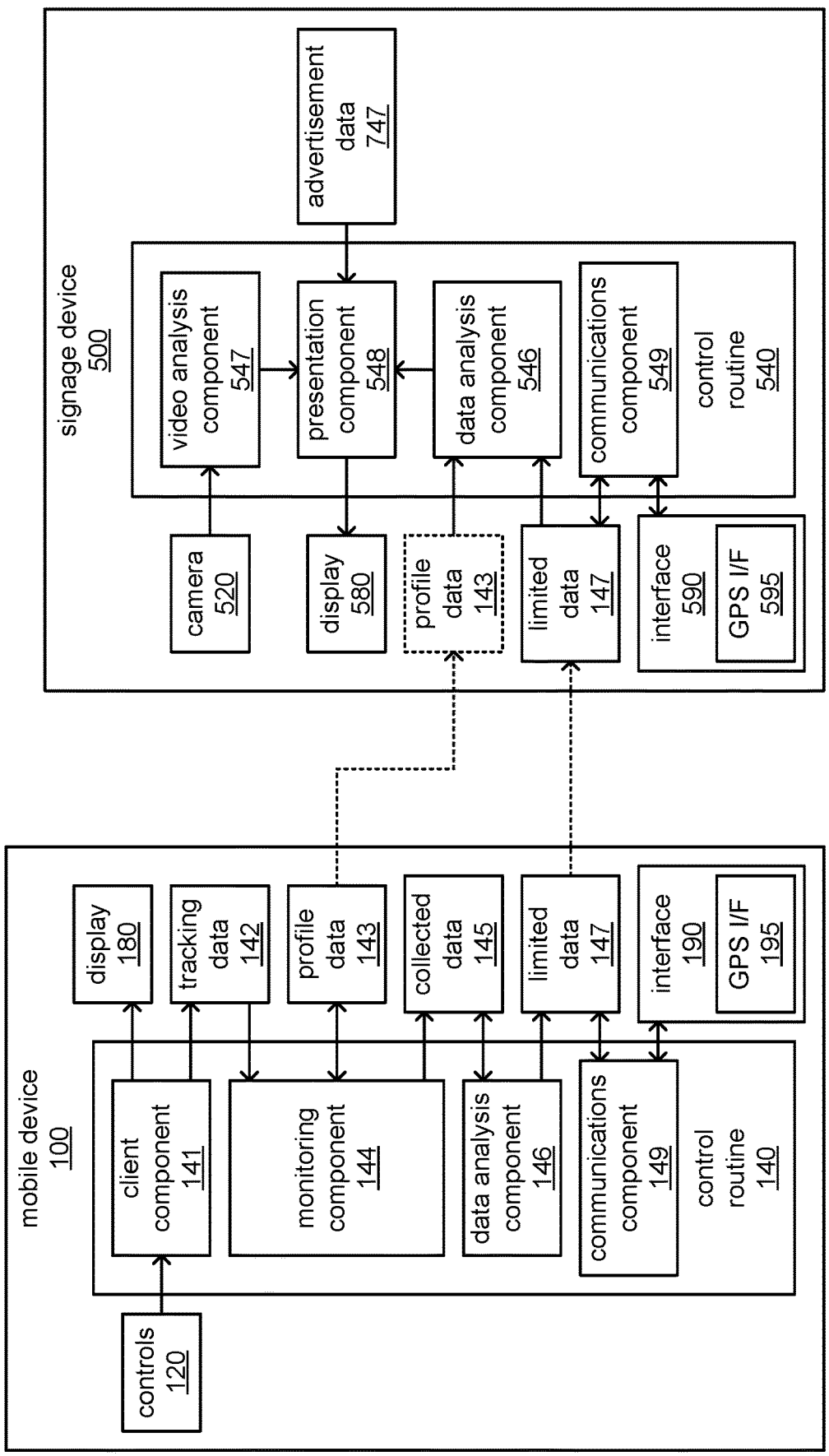
FIG. 3 illustrates a second embodiment of interaction among computing devices.

FIG. 3 illustrates a block diagram of a portion (using a view quite similar to the more detailed view of FIG. 2) of a variation of the digital signage system 1000 of FIG. 1. This variation depicted in FIG. 3 is similar to what is depicted in FIG. 2 in many ways, and thus, like reference numerals are used to refer to like elements throughout. However, unlike the digital signage system 1000 as depicted in FIG. 1, in the variant of the digital signage system 1000 depicted in FIG. 3, the signage device 500 is data that is provided with data by the mobile device 100 that is more limited in scope than the collected data 145.

More specifically, a portion of the profile data 143 and a limited data 147 comprising results of data analysis performed by the processor circuit 120 of the mobile device 100 are provided to the signage device 500. The variety of data analysis described as performed by the processor circuit 550 on the collected data 145 in the digital signage system 1000 of FIG. 1 is, instead, performed by the processor circuit 150 in executing a data analysis component 146 in this variant of FIG. 3. The results of the data analysis performed by the processor circuit 150 comprise a series of keywords (also referred to as "word vectors") that are associated with and descriptive of online activities in which the mobile device 100 has been involved (e.g., websites visited, news feeds viewed, search texts typed, geographic locations traveled to as indicated by coordinates, etc.), but which do not reveal enough information to enable the identity of the operator of the mobile device 100 to be discerned. These results from execution of the data analysis component 146 are then transmitted to the signage device 500 as the limited data 147. In this way, the data analysis component 546 is provided with indications of subjects of interest to the person associated with the mobile device 100, but without receiving information revealing that person's identity.

Correspondingly, although portions of the profile data 143 providing a description of visually identifiable traits of the operator of the mobile device 100 are provided to the signage device 500 along with the limited data 147, other portions of the profile data 143 comprising information revealing of the identity of the operator of the mobile device 100 (e.g., name, address, phone numbers, email address, employer, etc.) are not.

Figure 4:
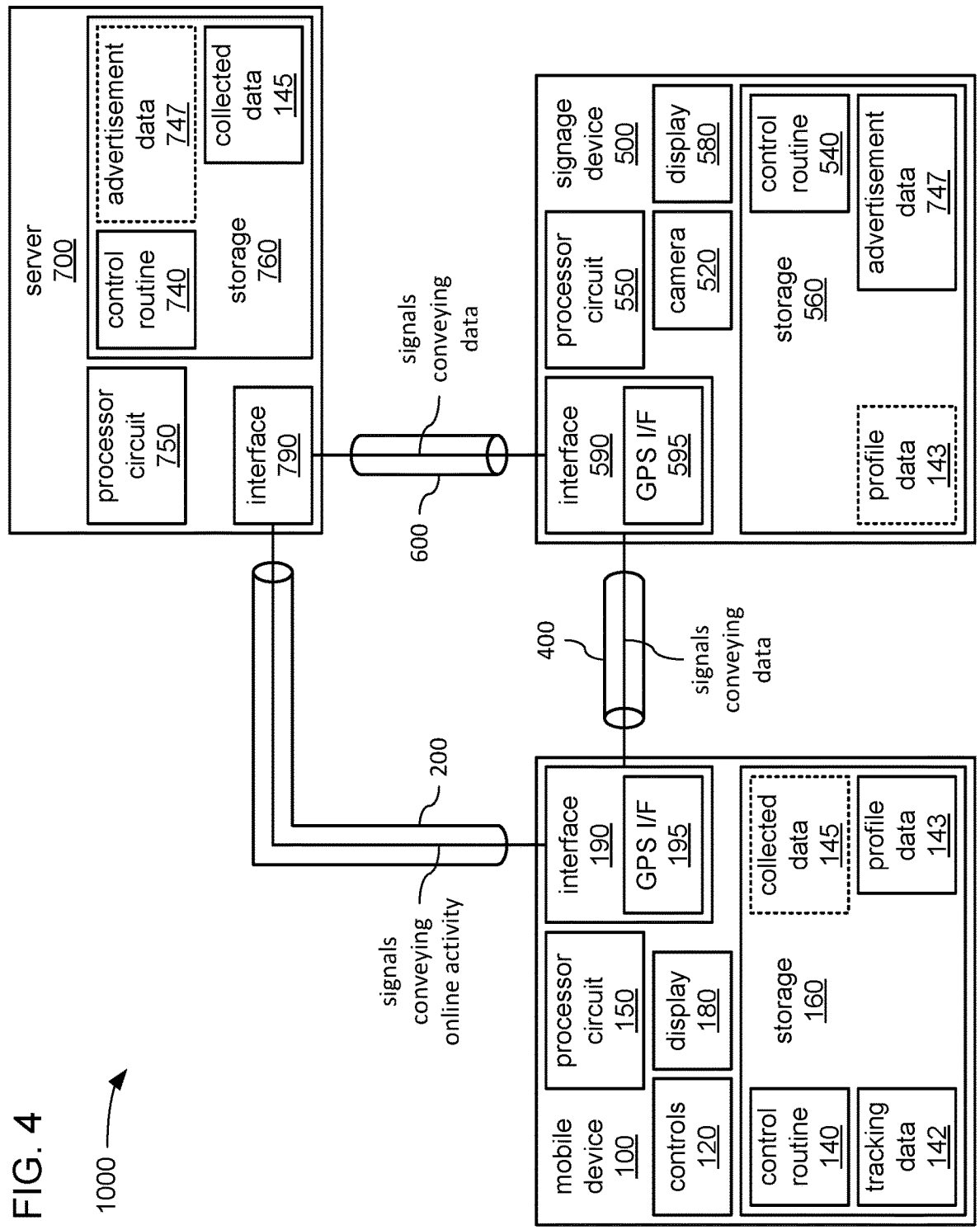
FIG. 4 illustrates a third embodiment of interaction among computing devices.

FIG. 4 illustrates a block diagram of another variation of the digital signage system 1000 of FIG. 1. This variation depicted in FIG. 4 is similar to what is depicted in FIG. 1 in many ways, and thus, like reference numerals are used to refer to like elements throughout. However, unlike the digital signage system 1000 as depicted in FIG. 1, in the variant of the digital signage system 1000 depicted in FIG. 4, the collected data 145 is provided by the mobile device 100 to the server 700 via the link 200 to be analyzed by the server 700 to identify subjects of interest to the operator of the mobile device 100, instead of being provided to the signage device 500 for such analysis.

In a similar manner to what was discussed in reference to FIG. 1, the mobile device 100 still provides the signage device 500 with at least a portion of the profile data 143 indicating visually identifiable traits of the operator of the mobile device 100 upon formation of the link 400. However, the profile data 143 necessarily includes some form of identifier uniquely identifying the operator of the mobile device 100, and the signage device 500 uses the identifier in contacting the server 700 via the link 600 in response to receiving the profile data 143 to obtain indications of what subjects are of interest to the person associated with the identifier. The identifier could be a piece of personal information concerning the operator of the mobile device 100 (e.g., their name), or it could be an identification code assigned to the operator to make the provision of at least some of their personal information directly to signage device 500 unnecessary, providing some degree of privacy protection.

Once provided with indications from the server 700 of subjects of interest to the operator of the mobile device 100 in this more indirect manner via the link 600, the processor 550 of the signage device 500 proceeds as previously described in awaiting an instance of a person being detected as looking in the direction of the display 580 who has visually identifiable traits matching those of the operator. And as previously described, the processor circuit 550 is caused to retrieve advertising from the advertisement data 747 that relates to one or more of those subjects of interest, and to visually present that advertising on the display 580.

FIG. 5 illustrates one embodiment of a logic flow 2100. The logic flow 2100 may be representative of some or all of the operations executed by one or more embodiments described herein. More specifically, the logic flow 2100 may illustrate operations performed by the processing circuit 150 of the mobile device 100 in executing at least the control routine 140.

At 2110, a mobile device (e.g., the mobile device 100) stores visually identifiable traits of the operator in a profile data (e.g., the profile data 143). As has been discussed, the operator of a mobile device may be requested to provide some personal information such as information specifically identifying the operator (e g, name, address, contact information, etc.) and indications of visually identifiable traits (e.g., age, gender, etc.).

At 2120, the mobile device monitors the operator's use of the mobile device in online activities entailing interactions with other computing devices via network(s) and/or the Internet.

At 2130, indications of what servers have been interacted with (e.g., IP addresses, URLs, etc., identifying servers such as the server 300) are stored as part of a collected data (e.g., the collected data 145). At 2132, text typed by the operator and/or identities of displayed objects that have been selected by the operator are also stored as part of the collected data. At 2134, as previously discussed, indications of geographic locations to which the operator has carried by the mobile device may also be stored as part of the collected data.

At 2140, the mobile device detects that it has come into close vicinity to a signage device (e.g., the signage device 500) such that a link (e.g., the link 400) may be formed between them.

At 2150, the mobile device transmits the collected data and at least a portion of the profile data that includes indications of visually identifiable traits of the operator to the signage device. As has been discussed, in some embodiments, the operator may be provided with the option of allowing only information concerning their visually identifiable traits to be transmitted to the signage device, and not information that would uniquely identify them (e.g., name, address, contact information, etc.).

FIG. 6 illustrates one embodiment of a logic flow 2200. The logic flow 2200 is a variant of, but similar to the logic flow 2100, with the logic flow 2100 at 2110 through 2134 being substantially identical to the logic flow 2200 at 2210 through 2234, respectively. However, following 2134 and 2234, the logic flows 2100 and 2200, respectively, diverge.

At 2240, the mobile device transmits the collected data to a server (e.g., the server 700) associated with the signage device.

At 2250, the mobile device detects that it has come into close vicinity to the signage device such that a link (e.g., the link 400) may be formed between them.

At 2260, the mobile device transmits at least a portion of the profile data that includes the indications of visually identifiable traits of the operator to the signage device along with some form of identifying information that is unique to the operator. As previously discussed, such an identifier may be a code number or other designation given to the operator that enables signage device to request information from a server that indicates subjects of interest to the operator, but without requiring their actual name or other identifying information to be transmitted to the signage device.

Figure 7:
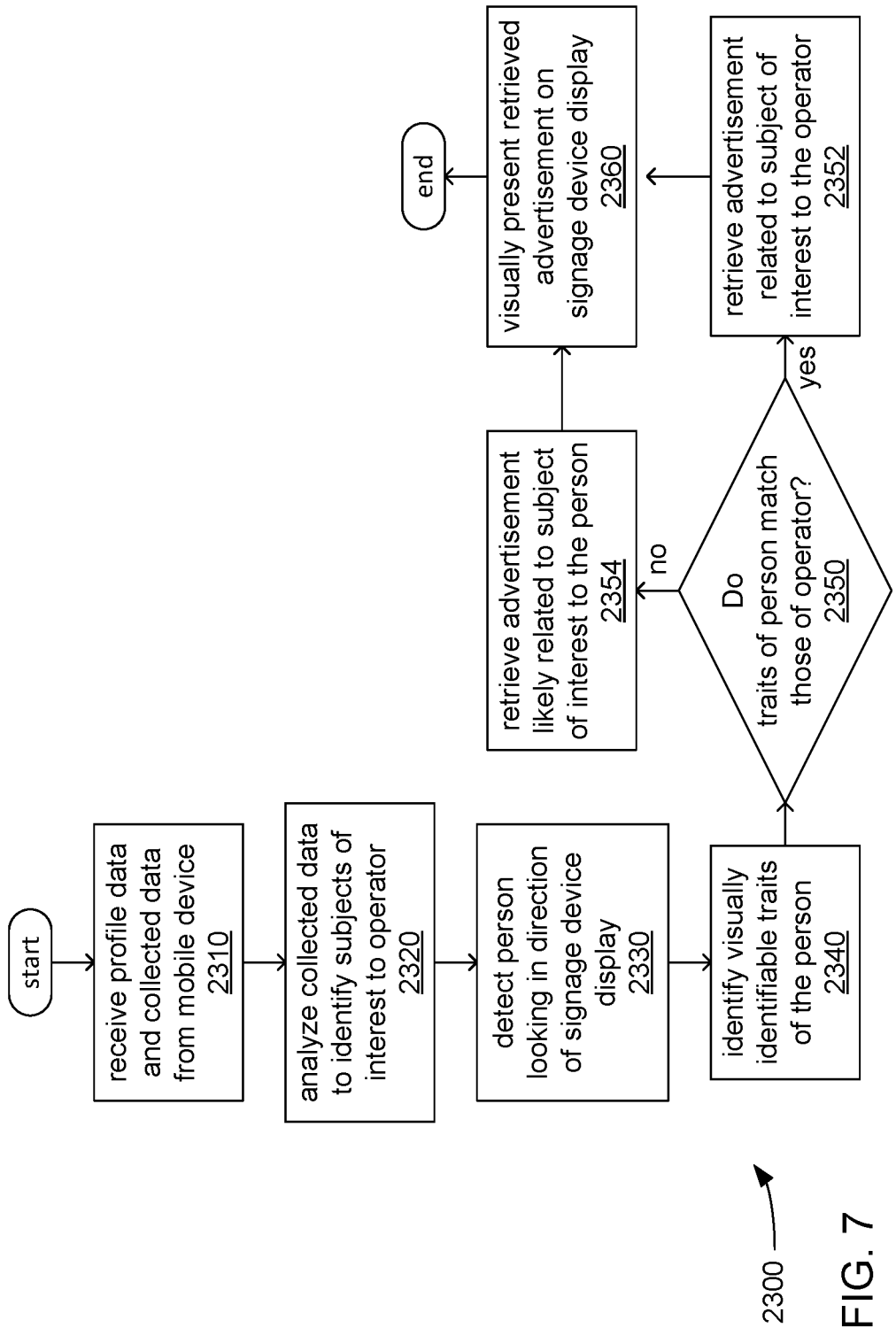
FIG. 7 illustrates an embodiment of a third logic flow.

FIG. 7 illustrates one embodiment of a logic flow 2300. The logic flow 2300 may be representative of some or all of the operations executed by one or more embodiments described herein. More specifically, the logic flow 2300 may illustrate operations performed by the processing circuit 550 of the signage device 500 in executing at least the control routine 540.

At 2310, a signage device (e.g., the signage device 500) receives from a mobile device (e.g., the mobile device 100) both a collected data (e.g., the collected data 145) concerning online activities of an operator of the mobile device and at least a portion of a profile data (e.g., the profile data 143) that at least specifies visually identifiable traits of the operator. Again, as previously discussed, the operator may have been given a choice by the mobile device to allow only information specifying visually identifiable traits to be transmitted.

At 2320, the signage device analyzes the collected data to identify subjects of interest to the operator of the mobile device. As previously discussed, patterns and correlations are analyzed in the collected data to identify subjects in which the operator demonstrated greater interest than others.

At 2330, the signage device detects a person looking in the direction of a display of the signage device. As has been discussed, the signage device includes a camera positioned to enable distinguishing between persons looking in the direction of the display from those who are not.

At 2340, the signage device identifies traits of the person detected as looking in the direction of the display (e.g., age, gender, etc.) employing video analysis techniques that will be familiar to those skilled in the art.

At 2350, the traits concerning the operator conveyed to the signage device as part of the profile data are compared to the traits identified in the person detected as looking in the direction of the display. If the comparison reveals that the traits match, then it is assumed to be possible that the person detected as looking in the direction of the display 580 is the operator, and at 2352, the signage device retrieves an advertisement from an advertisement data (e.g., the advertisement data 747) that is related to a subject of interest to the operator. However, if the comparison reveals that the traits do not match, then it is assumed that the person detected as looking in the direction of the display 580 is someone other than the operator, and at 2354, the signage device retrieves an advertisement that is deemed likely to be of interest to a person having the traits of the person detected as looking in the direction of the display.

At 2360, regardless of the criterion employed to select the advertisement that is retrieved from the advertisement data, the selected advertisement is visually presented on the display.

Figure 8:
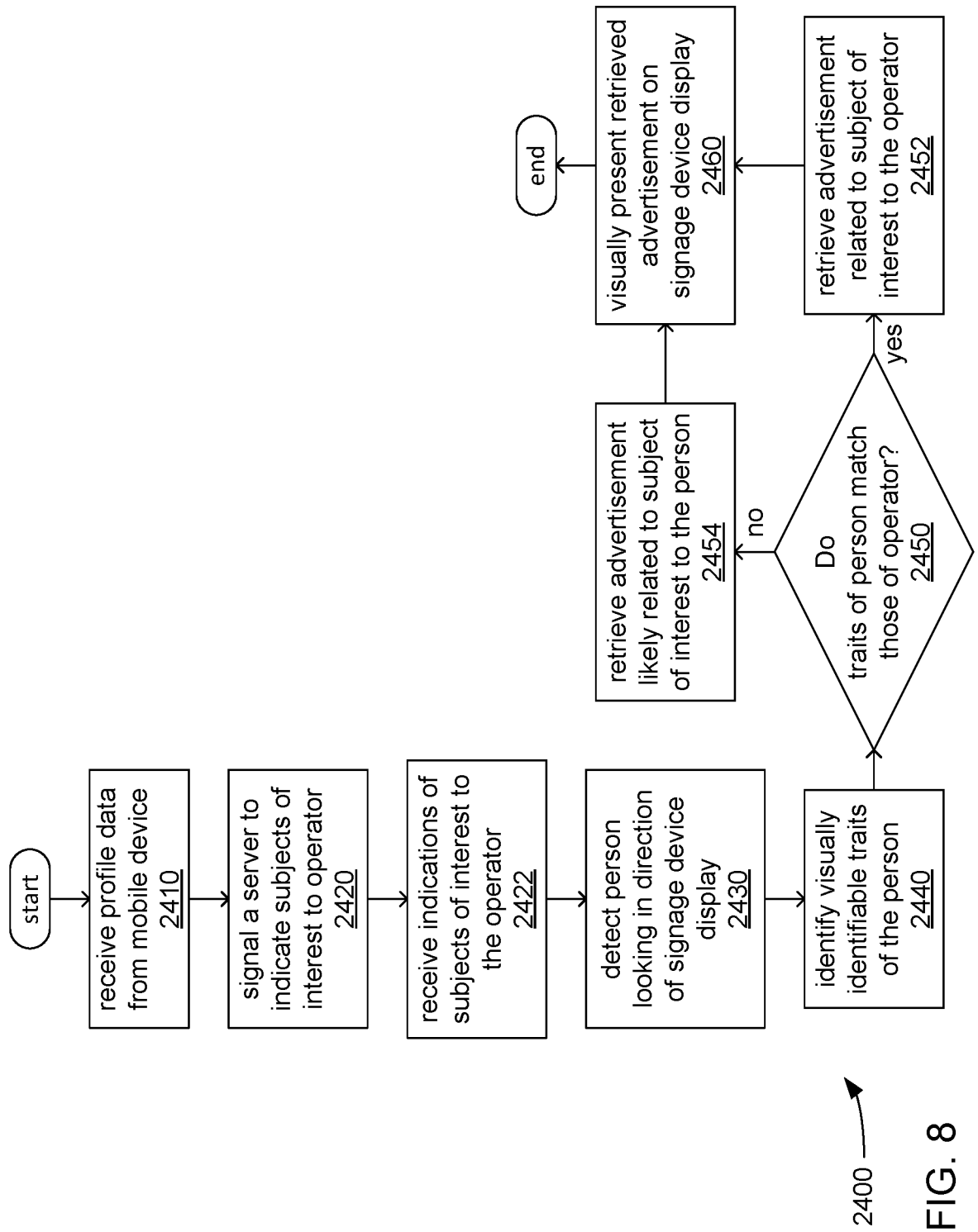
FIG. 8 illustrates an embodiment of a fourth logic flow.

FIG. 8 illustrates one embodiment of a logic flow 2400. The logic flow 2400 is a variant of, but similar to the logic flow 2300, with the logic flow 2300 at 2330 through 2360 being substantially identical to the logic flow 2400 at 2430 through 2460, respectively. However, preceding 2330 and 2430, the logic flows 2300 and 2400, respectively, differ.

At 2410, a signage device (e.g., the signage device 500) receives from a mobile device (e.g., the mobile device 100) a profile data (e.g., the profile data 143) specifying at least visually identifiable traits of an operator of the mobile device and an identifier that identifies the operator. Again, as previously discussed, the identifier may be a code number or other designation that identifies the operator without actually causing a piece of identifying information of the operator to be transmitted to the signage device.

At 2420, the signage device signals a server (e.g., the server 700) with the identifier and requests information from the server indicating subjects of interest to the operator. As previously discussed, the server will have earlier received collected data (e.g., the collected data 145) from the mobile device comprising information concerning online activities of the operator, and will have earlier analyzed the collected data to identify subjects of interest to the operator. At 2422, the server transmits the requested information concerning subjects of interest to the operator.

FIG. 9 illustrates one embodiment of a logic flow 2500. The logic flow 2500 may be representative of some or all of the operations executed by one or more embodiments described herein. More specifically, the logic flow 2500 may illustrate operations performed by the processing circuit 550 of the signage device 500 in executing at least the control routine 540.

At 2510, a signage device (e.g., the signage device 500) receives from a mobile device (e.g., the mobile device 100) both a collected data (e.g., the collected data 145) concerning online activities of an operator of the mobile device and at least a portion of a profile data (e.g., the profile data 143) that at least specifies visually identifiable traits of the operator.

At 2520, the signage device analyzes the collected data to identify subjects of interest to the operator of the mobile device.

At 2530, the signage device detects a person looking in the direction of a display of the signage device where that person has visually identifiable traits that match those of the operator as specified in the profile data.

At 2540, the signage device retrieves an advertisement from an advertisement data (e.g., the advertisement data 747) that is related to a subject of interest to the operator.

At 2550, the signage device visually presents the advertisement on the display.

FIG. 10 illustrates one embodiment of a logic flow 2600. The logic flow 2600 may be representative of some or all of the operations executed by one or more embodiments described herein. More specifically, the logic flow 2600 may illustrate operations performed by the processing circuit 750 of the server 700 in executing at least the control routine 740.

At 2610, a server (e.g., the server 700) receives from a mobile device (e.g., the mobile device 100) a collected data (e.g., the collected data 145) concerning online activities of an operator of the mobile device.

At 2620, the server analyzes the collected data to identify subjects of interest to the operator of the mobile device.

At 2630, the server receives a request from a signage device (e.g., the signage device 500) for information indicating subjects of interest to the operator. As previously discussed, the signage device includes in its request to the server an identifier received by the signage device from the mobile device that specifically identifies the operator of the mobile device. At an earlier time when the server received the collected data from the mobile device, the server also received the same identifier therewith. The receipt of the identifier also from the signage device enables the earlier-received collection data (and the subjects of interest found to be indicated thereby) from the mobile device to be correlated with the later-received request for subjects of interest from the signage device.

At 2640, the server transmits to the signage device the requested information indicating subjects of interest to the operator.

Figure 11:
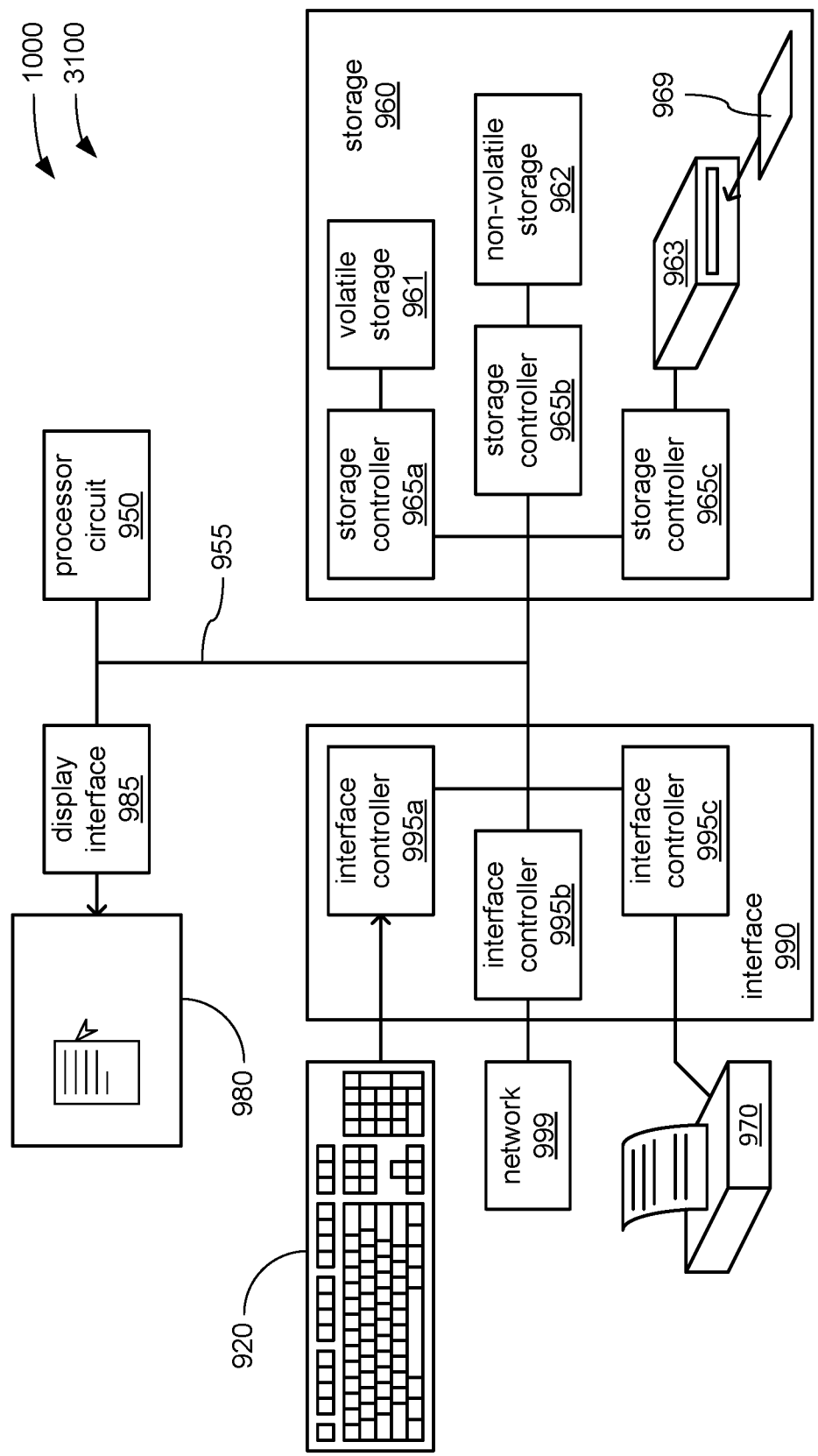
FIG. 11 illustrates an embodiment of a processing architecture.

FIG. 11 illustrates an embodiment of an exemplary processing architecture 3100 suitable for implementing various embodiments as previously described. More specifically, the processing architecture 3100 (or variants thereof) may be implemented as part of one or more of the computing devices 100, 300, 500 and 700. It should be noted that components of the processing architecture 3100 are given reference numbers in which the last two digits correspond to the last two digits of reference numbers of components earlier depicted and described as part of each of the computing devices 100, 300, 500 and 700. This is done as an aid to correlating such components of whichever ones of the computing devices 100, 300, 500 or 700 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 300, 500 or 700 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 350, 550 or 750) may comprise any of a wide variety of commercially available processors, employing any of a wide variety of technologies and implemented with one or more cores physically combined in any of a number of ways.

As previously discussed, the storage 960 (corresponding to one or more of the storages 160, 360, 560 or 760) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 390, 590 and 790) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 970) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from operator input devices, such as the depicted keyboard 920 (perhaps corresponding to the controls 120). The interface controller 995b may employ any of a variety of cabling-based or wireless signaling, timings and/or protocols to access other computing devices through the depicted network 999 (perhaps a network comprising one or more links, such as the links 200, 400 or 600; smaller networks; or the Internet). The interface 995c may employ any of a variety of electrically conductive cabling enabling the use of either serial or parallel signal transmission to convey data to the depicted printer 970. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to one or more of the displays 180 and 580), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 300, 500 and 700 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example apparatus comprises a processor circuit; an interface operative to communicatively couple the processor circuit to a network; and a storage communicatively coupled to the processor circuit and arranged to store a sequence of instructions. The sequence of instructions is operative on the processor circuit to monitor online activities comprising interactions with a computing device via the interface and the network; store collected data about the online activities; store profile data comprising visually identifiable traits; detect a signage device; and form a link with the signage device via the interface and transmit the profile data to the signage device via the link in response to detection of the signage device.

The above example of apparatus in which the profile data comprises an identifier associated with an operator associated with the online activities, and the instructions operative on the processor circuit to transmit the collected data and the identifier to a server in response to detection of the signage device.

Either of the above examples of apparatus in which the instructions are operative on the processor circuit to transmit the collected data to the signage device via the link in response to detection of the signage device.

Any of the above example of apparatus in which the collected data comprises at least one of an identity of the computing device, text information sent to the computing device, and an identity of an object visually presented on a display.

Any of the above examples of apparatus in which the instructions are operative on the processor circuit to analyze the collected data to derive a limited data comprising a word vector reflective of the online activities; and transmit the limited data to the signage device via the link in response to detection of the signage device.

Any of the above examples of apparatus in which the instructions are operative on the processor circuit to receive data indicating a geographic location of the signage device from the signage device via the link, and store an indication of the geographic location of the signage device in the collected data.

Any of the above examples of apparatus in which the apparatus comprises a global positioning system (GPS) interface, and the instructions operative on the processor circuit to operate the GPS interface to identify a geographic location of the apparatus and store an indication of the geographic location in the collected data.

Any of the above examples of apparatus in which the visually identifiable traits comprise at least one of an age of the operator and a gender of the operator.

Any of the above examples of apparatus in which the apparatus comprises controls, and the instructions operative on the processor circuit to present a request for data about the operator; receive a signal indicative of operation of the controls to provide data concerning the operator; and store the provided data about the operator in the profile data.

An example of another apparatus comprises a processor circuit; a display; a camera; an interface operative to communicatively couple the processor circuit to a network; and a storage communicatively coupled to the processor circuit and arranged to store a sequence of instructions. The sequence of instruction is operative on the processor circuit to detect a mobile device; in response to detection of the mobile device, form a link with the mobile device via the interface and receive profile data comprising visually identifiable traits associated with an operator of the mobile device via the link; receive video data from the camera comprising an image of visually identifiable traits of a viewer detected as looking in the direction of the display; compare the visually identifiable traits of the video data to the visually identifiable traits of the profile data; select a first advertisement associated with a subject of interest in response to a match between at least one visually identifiable trait of the video data and at least one visually identifiable trait of the profile data; and visually present the first advertisement on the display.

The above example of another apparatus in which the instructions are operative on the processor circuit to select a second advertisement associated with the visually identifiable traits of the video data and to visually present the second advertisement on the display in response to at least one visually identifiable trait of the video data not matching at least one visually identifiable trait of the profile data.

Either of the above examples of another apparatus in which the instructions are operative on the processor circuit to receive from the mobile device via the link a collected data about use of the mobile device in online activities comprising the mobile device interacting with a computing device; and analyze the collected data to identify the subject of interest.

Any of the above examples of another apparatus in which the collected data comprises at least one of an identity of the computing device, text information sent to the computing device by the mobile device, and an identity of an object visually presented on a display the mobile device.

Any of the above examples of another apparatus in which the instructions are operative on the processor circuit to receive from the mobile device via the link a limited data comprising a word vector derived from analysis of use of the mobile device in online activities comprising the mobile device interacting with a computing device; and analyze the limited data to identify the subject of interest.

Any of the above examples of another apparatus in which the visually identifiable traits comprise at least one of an age of the operator and a gender of the operator.

Any of the above examples of another apparatus in which the profile data comprises an identifier associated with the operator, and the instructions operative on the processor circuit to transmit the identifier to a server via the network to request an indication of the subject of interest; and receive from the server via the network the indication of the subject of interest.

Any of the above examples of another apparatus in which the apparatus comprises a GPS interface, and the instructions operative on the processor circuit to operate the GPS interface to identify a geographic location of the apparatus, and transmit an indication of the geographic location to the mobile device.

An example of a computer-implemented method comprises receiving at a signage device a profile data comprising visually identifiable traits of an operator of a mobile device and a collected data about use of the mobile device in online activities comprising the mobile device interacting with a computing device; analyzing the collected data to identify a subject of interest; receiving video data from a camera of the signage device comprising an image of visually identifiable traits of a viewer detected as looking in the direction of a display of the signage device; comparing the visually identifiable traits of the video data to the visually identifiable traits of the profile data; select a first advertisement associated with the subject of interest or a second advertisement associated with the visually identifiable traits of the video data based on the comparison; and visually presenting the selected advertisement on the display of the signage device.

The above example of a computer-implemented method comprises detecting the mobile device; and in response to detection of the mobile device, forming a link between the mobile device and the signage device, and receiving the profile data and the collected data.

Either of the above examples of a computer-implemented method in which the collected data comprises at least one of an identity of the computing device, text information sent to the computing device by the mobile device, and an identity of an object visually presented on a display of the mobile device.

Any of the above examples of a computer-implemented method comprises operating a GPS interface of the signage device to identify a geographic location of the signage device, and transmitting an indication of the geographic location to the mobile device.

Any of the above examples of a computer-implemented method in which the visually identifiable traits comprise at least one of an age of the operator and a gender of the operator.

An example of at least one machine-readable storage medium comprises instructions that when executed by a computing device, cause the computing device to receive from a mobile device collected data about use of the mobile device in online activities comprising the mobile device interacting with another computing device; analyze the collected data to identify a subject of interest; receive a request from a signage device for an indication of the subject of interest; and transmit an indication of the subject of interest to the signage device.

The above example of at least one machine-readable storage medium in which the computing device is caused to receive an identifier associated with an operator of the mobile device from the mobile device; receive the identifier from the signage device in the request; and select the subject of interest to based on the identifier.

Either of the above examples of at least one machine-readable storage medium in which the collected data comprises at least one of an identity of the computing device, text information sent to the computing device by the mobile device, and an identity of an object visually presented on a display of the mobile device.

Any of the above examples of at least one machine-readable storage medium in which the collected data comprises an indication of a geographic location to which the mobile device has been carried.

Any of the above examples of at least one machine-readable storage medium in which the collected data comprises an indication of a geographic location of the signage device.

The invention claimed is:

1. A mobile computing device, comprising:
   a processor circuit; and
   a storage communicatively coupled to the processor circuit, the storage to store instructions for execution by the processor circuit to cause the mobile computing device to:
   monitor a plurality of inputs received via a display or one or more controls of the mobile computing device to determine collected data describing one or more online activities of the mobile computing device;
   request one or more visually identifiable traits of an operator of the mobile computing device via the display or one or more controls of the mobile computing device;
   determine at least one of the one or more visually identifiable traits of the operator based on input received in response to the request for one or more visually identifiable traits of the operator of the mobile computing device;
   store the collected data describing the one or more online activities of the mobile computing device;

analyze the collected data to determine one or more word vectors that indicate one or more interests of the operator of the mobile computing device without revealing sufficient information to discern an identity of the operator of the mobile computing device;

store limited data comprising the one or more word vectors;

store profile data indicating personal information of the operator and the one or more visually identifiable traits for visual identification of the operator in video data, wherein the personal information is comprised in a first portion of the profile data and the one or more visually identifiable traits are comprised in a second portion of the profile data;

determine to transmit the first portion of the profile data to signage devices based on input received in response to an option presented via the display or one or more controls of the mobile computing device; and in response to a detection of a signage device located within a vicinity of the mobile computing device:
establish a wireless link with the signage device; and
transmit the limited data and at least the second portion of the profile data to the signage device over the wireless link to cause the signage device to monitor video from a video camera to detect the operator based on the one or more visually identifiable traits in the profile data.

2. The mobile computing device of claim 1, the collected data to include uniform resource locators (URLs) for one or more visited websites.

3. The mobile computing device of claim 1, the collected data to identify one or more entered search terms.

4. The mobile computing device of claim 1, the collected data to include internet protocol (IP) addresses for one or more servers.

5. The mobile computing device of claim 1, the profile data to indicate one or both of an operator age and an operator gender.

6. The mobile computing device of claim 1, the storage to store instructions for execution by the processor circuit to cause the mobile computing device to:
collect geographic location data for the mobile computing device by monitoring a global positioning system (GPS) interface; and
transmit the geographic location data to the signage device over the wireless link.

7. The mobile computing device of claim 1, the storage to store instructions for execution by the processor circuit to cause the mobile computing device to:
receive tracking data from a server; and
incorporate at least a portion of the received tracking data into the collected data.

8. The mobile computing device of claim 7, the received tracking data to include one or more cookies.

9. The mobile computing device of claim 1, comprising a touchscreen display communicatively coupled to the processor circuit.

10. A computer-implemented method for a mobile computing device, comprising:
monitoring a plurality of inputs received via a display or one or more controls of a mobile computing device to determine collected data describing one or more online activities of a mobile computing device;
requesting one or more visually identifiable traits of an operator of the mobile computing device via the display or one or more controls of the mobile computing device;
determining at least one of the one or more visually identifiable traits of the operator based on input received in response to the request for one or more visually identifiable traits of the operator of the mobile computing device;
storing profile data and the collected data in a storage of a mobile computing device, the profile data to indicate personal information of the operator and the one or more visually identifiable traits for visual identification of the operator in video data, wherein the personal information is comprised in a first portion of the profile data and the one or more visually identifiable traits are comprised in a second portion of the profile data;
determining to transmit the first portion of the profile data to signage devices based on input received in response to an option presented via the display or one or more controls of the mobile computing device;
analyzing the collected data to determine one or more word vectors that indicate one or more interests of the operator of the mobile computing device without revealing sufficient information to discern an identity of the operator of the mobile computing device;
storing limited data in the storage of the mobile computing device, the limited data comprising the one or more word vectors;
detecting a signage device located within a vicinity of the mobile computing device;
establishing a wireless link with the signage device; and
transmitting the limited data and at least the second portion of the profile data to the signage device over the wireless link to cause the signage device to monitor video data from a video camera to detect the operator based on the one or more visually identifiable traits in the profile data.

11. The computer-implemented method of claim 10, the collected data to include uniform resource locators (URLs) for one or more visited websites.

12. The computer-implemented method of claim 10, the collected data to identify one or more entered search terms.

13. The computer-implemented method of claim 10, the collected data to include internet protocol (IP) addresses for one or more servers.

14. The computer-implemented method of claim 10, the profile data to indicate one or both of an operator age and an operator gender.

15. The computer-implemented method of claim 10, comprising:
collecting geographic location data for the mobile computing device by monitoring a global positioning system (GPS) interface; and
transmitting the geographic location data to the signage device over the wireless link.

16. The computer-implemented method of claim 10, comprising:
receiving tracking data from a server; and
incorporating at least a portion of the received tracking data into the collected data.

17. The computer-implemented method of claim 16, the received tracking data to include one or more cookies.

18. At least one non-transitory machine-readable storage medium comprising instructions that, when executed at a mobile computing device, cause the mobile computing device to:

monitor a plurality of inputs received via a display or one or more controls of the mobile computing device to determine collected data describing one or more online activities of the mobile computing device;

request one or more visually identifiable traits of an operator of the mobile computing device via the display or one or more controls of the mobile computing device;

determine at least one of the one or more visually identifiable traits of the operator based on input received in response to the request for one or more visually identifiable traits of the operator of the mobile computing device;

store the collected data describing the one or more online activities of the mobile computing device;

analyze the collected data to determine one or more word vectors that indicate one or more interests of the operator of the mobile computing device without revealing sufficient information to discern an identity of the operator of the mobile computing device;

store limited data comprising the one or more word vectors;

store profile data indicating personal information of the operator and the one or more visually identifiable traits for visual identification of the operator in video data, wherein the personal information is comprised in a first portion of the profile data and the one or more visually identifiable traits are comprised in a second portion of the profile data;

determine to transmit the first portion of the profile data to signage devices based on input received in response to an option presented via the display or one or more controls of the mobile computing device; and in response to a detection of a signage device located within a vicinity of the mobile computing device:
establish a wireless link with the signage device; and
transmit the limited data and at least the second portion of the profile data to the signage device over the wireless link to cause the signage device to monitor video from a video camera to detect the operator based on the one or more visually identifiable traits in the profile data.

19. The at least one non-transitory machine-readable storage medium of claim 18, the collected data to include uniform resource locators (URLs) for one or more visited websites.

20. The at least one non-transitory machine-readable storage medium of claim 18, the collected data to identify one or more entered search terms.

21. The at least one non-transitory machine-readable storage medium of claim 18, the collected data to include internet protocol (IP) addresses for one or more servers.

22. The at least one non-transitory machine-readable storage medium of claim 18, the profile data to indicate one or both of an operator age and an operator gender.

23. The at least one non-transitory machine-readable storage medium of claim 18, comprising instructions that, when executed at the mobile computing device, cause the mobile computing device to:

collect geographic location data for the mobile computing device by monitoring a global positioning system (GPS) interface; and transmit the geographic location data to the signage device over the wireless link.

24. The at least one non-transitory machine-readable storage medium of claim 18, comprising instructions that, when executed at the mobile computing device, cause the mobile computing device to:

receive tracking data from a server; and incorporate at least a portion of the received tracking data into the collected data.

25. The at least one non-transitory machine-readable storage medium of claim 24, the received tracking data to include one or more cookies.

* * * * *